United States Patent Office 3,372,683
Patented Mar. 12, 1968

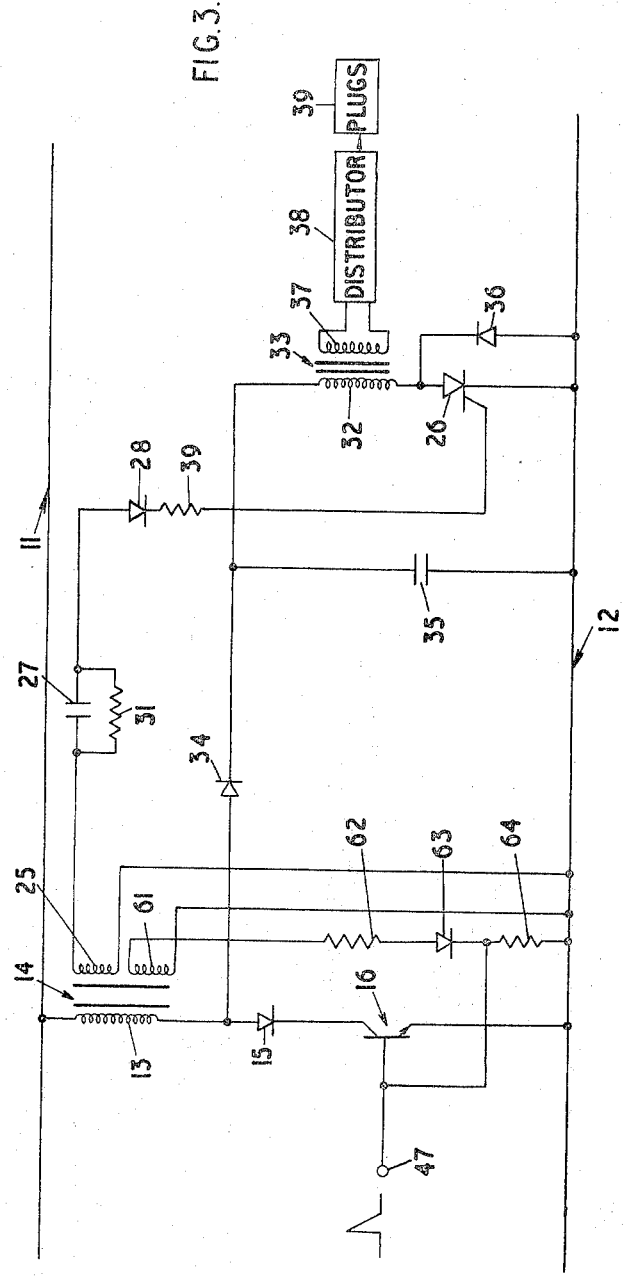

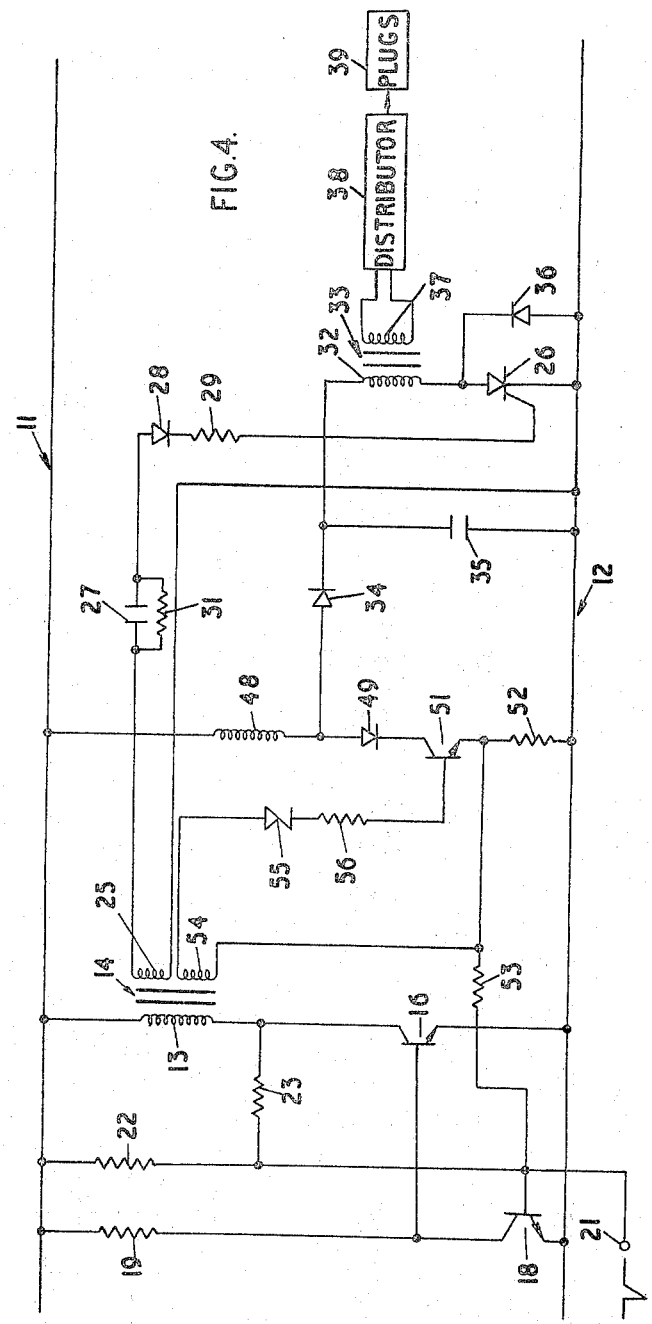

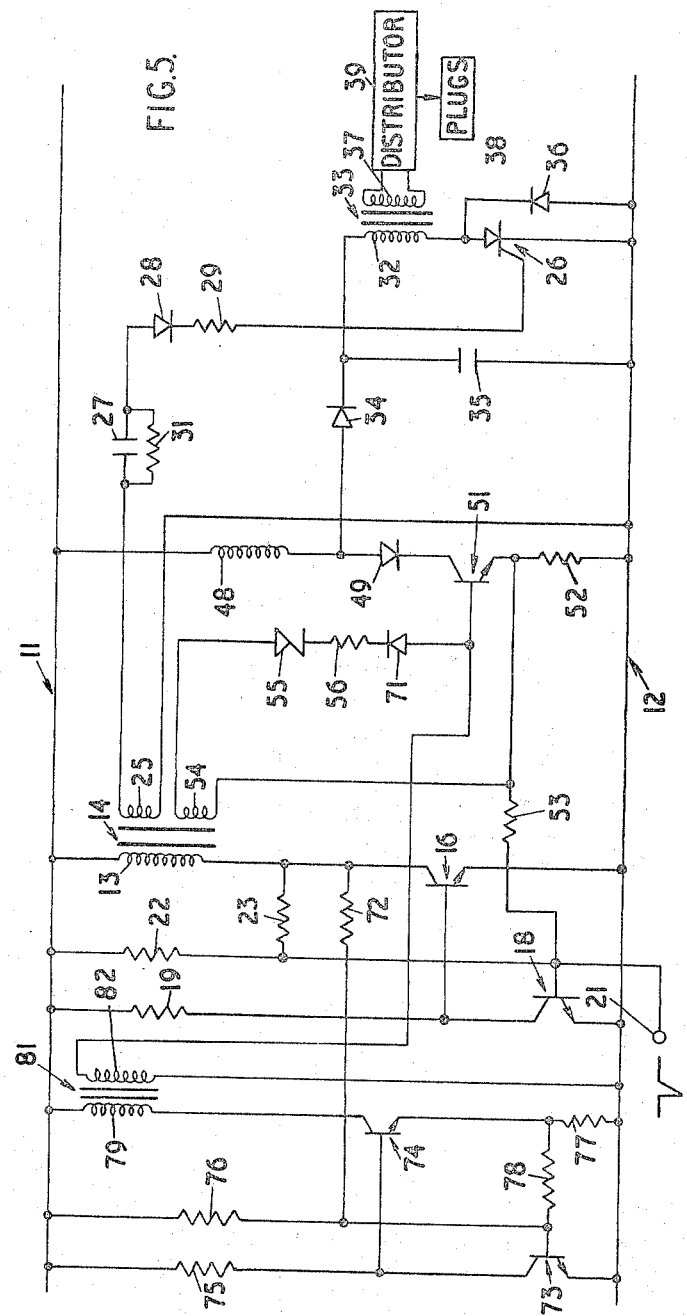

3,372,683
SPARK IGNITION SYSTEMS
Brian Leslie Phillips, Handsworth, and Derek Stanley Adams, Acocks Green, England, assignors to Joseph Lucas (Industries) Limited, Birmingham, England, a British company
Filed Mar. 8, 1966, Ser. No. 532,694
Claims priority, application Great Britain, Mar. 10, 1965, 10,112/65
12 Claims. (Cl. 123—148)

ABSTRACT OF THE DISCLOSURE

In a spark ignition circuit, means driven by the engine turns a switch on so that current flows through the switch to an inductor and is stored in the inductor. When the current flowing in the inductor reaches a predetermined value, the switch is turned off, and at this stage the energy in the inductor is transferred to a capacitor, where it is stored. The next time the switch is turned on again to store energy in the inductor, the controlled rectifier is turned on at the same time, the capacitor then discharging through an ignition transformer and the controlled rectifier to produce a spark.

This invention relates to spark ignition systems for internal combustion engines.

A spark ignition system according to the invention comprises in combination a pair of terminals for connection to the vehicle battery, a series circuit connected across said terminals and including an inductor, a diode and a capacitor, a first semi-conductor switch connected in a series circuit across the diode and capacitor, a second semi-conductor switch connected in a series circuit across the capacitor, means for turning said first switch on and off in timed relationship to the engine, energy being stored in the inductor when the first switch is on and transferred by way of the diode to the capacitor when the first switch is off, and means for turning the second switch on when a spark is required, discharge of the capacitor through the series circuit including said second switch producing the required spark, and said second switch being turned off when the capacitor has discharged.

In the accompanying drawings, FIGURES 1 to 5 are circuit diagrams illustrating five examples of the invention.

Figure 1:
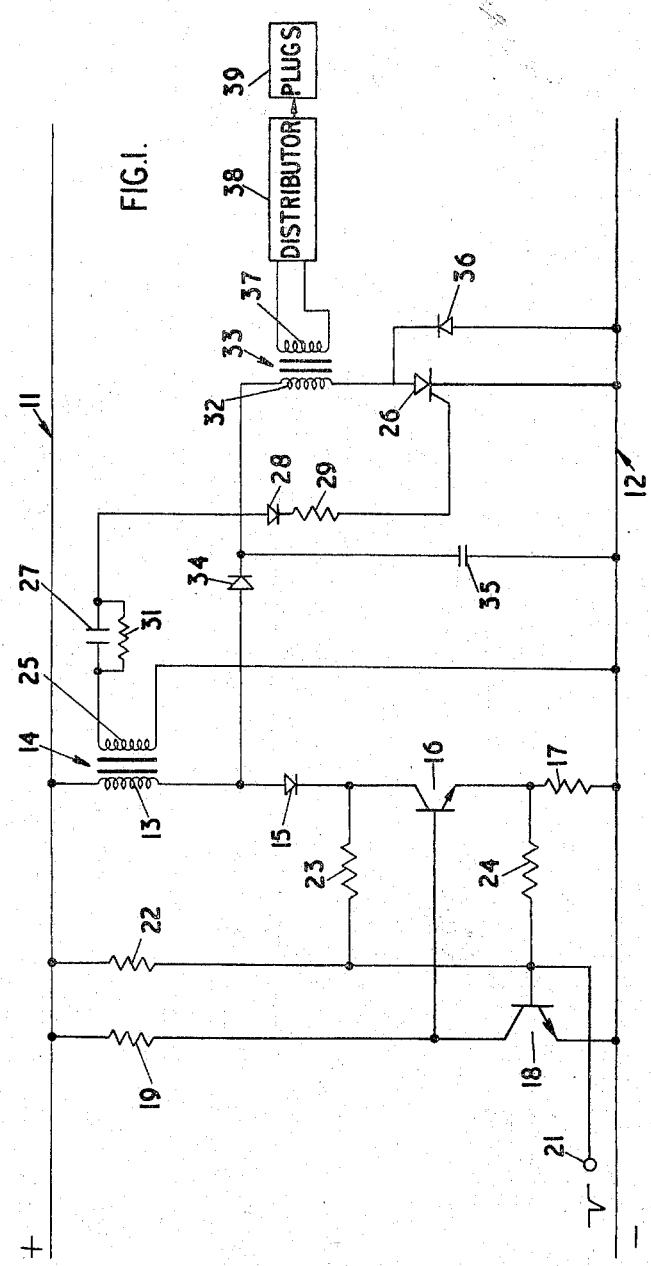

Referring to FIGURE 1, there are provided positive and negative lines 11, 12 which in use are connected to the battery of the vehicle. The lines are bridged by a series circuit including the primary winding 13 of a transformer 14, a diode 15, the collector and emitter of a transistor 16, and a resistor 17. The base of the transistor 16 is connected to the collector of a transistor 18 which has its emitter connected to the line 12, its collector connected to the base of the transistor 16, and, through a resistor 19, to the line 11, and its base connected to a terminal 21, and also connected through resistors 22, 23, 24 respectively to the line 11, the collector of the transistor 16, and the emitter of the transistor 16. One of the ends of the secondary winding 25 of the transformer 14 is connected to the line 12, and the other end is connected to the gate of a controlled rectifier 26 through a series circuit including a series circuit including a capacitor 27, a diode 28 and a resistor 29. The capacitor 27 is bridged by a resistor 31, and the rectifier 26 has its cathode connected to the line 12 and its anode connected to the line 11 through a series circuit containing the primary winding 32 of an ignition transformer 33, a diode 34 and the winding 13. The winding 32 and rectifier 26 are bridged by a capacitor 35, and the rectifier 26 is bridged by a diode 36. The secondary winding 37 of the ignition transformer is connected through a distributor 38 to the plugs 39 of the engine in turn.

In order to understand the operation of the circuit, assume that the capacitor 35 is charged, and the rectifier 26 is off. In these circumstances, the transistors 18 and 16 are on and off respectively. At the instant when a spark is required, a negative signal is applied to the terminal 21 by any convenient known means driven by the engine. This signal turns the transistor 18 off and the transistor 16 on, and the resultant rising current in the winding 13 causes a current to be generated which is applied to the gate of the rectifier 26 to turn it on. As soon as the rectifier 26 is turned on, the capacitor 35 discharges through the rectifier 26 and the winding 32 and a pulse is induced in the winding 37 to produce the required spark. The resonance of the discharge circuit of the capacitor 35 switches the controlled rectifier 26 off when the capacitor 35 has discharged.

While the capacitor 35 is discharging, current is building up in the series circuit including the winding 13, and when this current reaches a predetermined value, the voltage across the resistor 17 switches the transistor 18 on, so that the transistor 16 is switched off again. The energy stored in the inductor 13 is now transferred by way of the diode 34 to the capacitor 35, and is retained in the capacitor 35 by virtue of the diode 34. The circuit is now in its original condition, and a further spark is produced when another signal is applied to the terminal 21. It will be appreciated that the voltage to which the capacitor 35 is charged is considerably in excess of the battery voltage. Moreover, since the series circuit through the winding 13 remains completed until the voltage across the resistor 17 reaches a predetermined value, the charge transferred to the capacitor is substantially independent of battery voltage. The diode 15 is included to protect the transistor 16 from the reverse voltage induced in the winding 13, and the diodes 28, 36 protect the rectifier 26 from the reverse voltages generated in the transformers 14, and 33 respectively.

Figure 2:
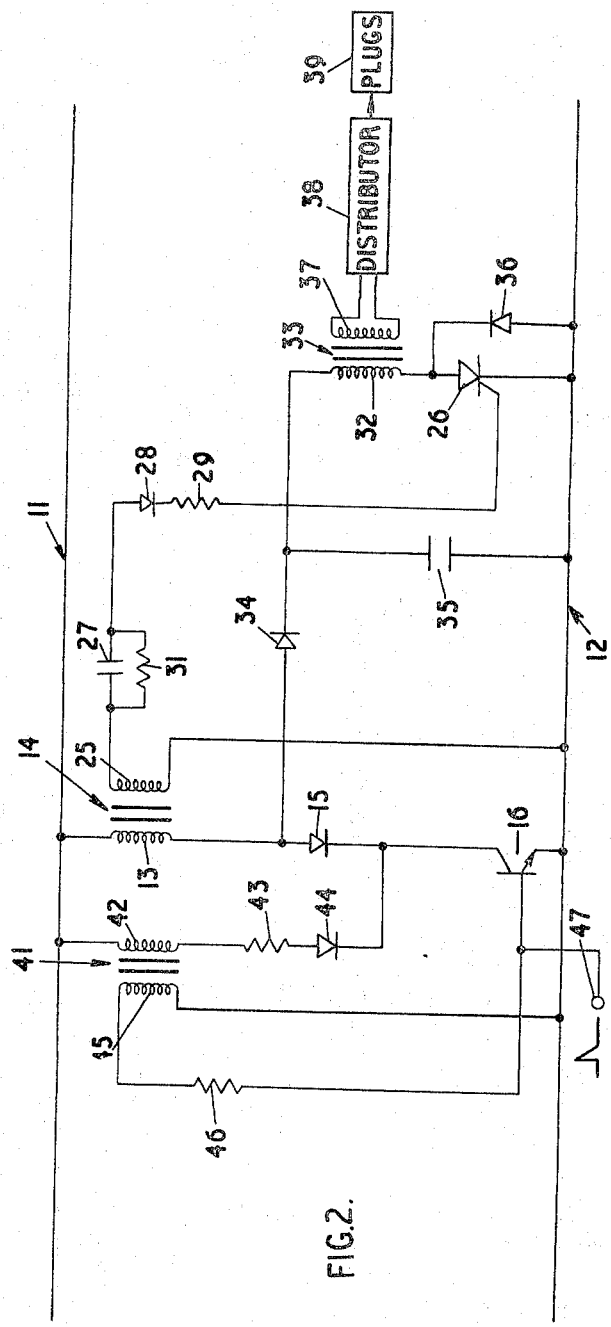

Referring now to FIGURE 2, it will be seen that the components 17, 18, 19, 21, 22, 23, 24 have been omitted. However, there is now provided a saturating transformer 41 the primary winding 42 of which has one end connected to the line 11, and its other end connected through a resistor 43 and a diode 44 in series to the collector of the transistor 16. The secondary winding 45 of the transformer 41 has one end connected to the line 12, and its other end connected through a resistor 46 to the base of the transistor 16, the base being further connected to a terminal 47.

The operation is similar to FIGURE 1, a positive pulse being applied to the terminal 47 to turn the transistor 16 on, and allow the capacitor 35 to discharge through the winding 32. However, instead of controlling the timing of the circuit by means of the resistor 17, the saturable transformer 41 is included. The winding 45 provides feedback to the base of the transistor 16 to maintain it conductive, but when the transformer 41 saturates, feedback ceases, and the transistor 16 resumes its non-conductive state in readiness for a further signal at the terminal 47.

FIGURE 2 has the advantage that a small saturable transformer can be used, but if a larger saturable transformer is employed the circuit shown in FIGURE 3 is satisfactory. In FIGURE 3, the components 41, 42, 43, 44, 45, 46 are omitted, but the transformer 14 is saturable and has an extra secondary winding 61. This winding has one end connected to the line 12 and its other end connected to the line 12 through a resistor 62, a diode 63 and a resistor 64 in series, a point between the diode 63 and resistor 64 being connected to the base of the transistor 16. The operation is similar to FIGURE 2. The resistor 64 provides a path for stored charge in the base of the transistor 16 on turn-off. The diode 63 could be connected between the emitter of the transistor 16 and the line 12.

In FIGURE 4, the components 15, 17, 24 shown in FIGURE 1 are omitted, and the winding 13 no longer constitutes the inductor which stores energy to be transferred to the capacitor 35. A separate inductor 48 is used, and is connected between the lines 11, 12 in series with a diode 49, a transistor 51 and a resistor 52. The connection from the winding 32 to the line 11 by way of the diode 34 is now made through the inductor 48 instead of the winding 13. The resistor 52 takes the place of the resistor 17, and a point intermediate the resistor 52 and the transistor 51 is connected to the base of the transistor 18 through a resistor 53. Moreover, the transformer 14 has an additional winding 54 one end of which is connected to the emitter of the transistor 51, and the other end of which is connected to the base of the transistor 51 through a Zener diode 55 and a resistor 56 in series.

The operation of this circuit is similar to the circuit shown in FIGURE 1. When a negative pulse is applied to the terminal 21 the transistors 18 and 16 turn off and on respectively, and the transformer 14 switches the rectifier 26 on so that the capacitor 35 can discharge to produce the spark. The transformer 14 also serves through the winding 54 to turn on the transistor 51, so that current flows in the inductor 48. When the current flowing in the resistor 52 reaches a predetermined value, the transistor 18 is switched on again and the transistor 16 switches off. The E.M.F. induced in the winding 54 now switches the transistor 51, and the energy stored in the inductor 48 is transferred to the capacitor 35 and is retained by the diode 34. The transistor 51 and diode 49 could be replaced by a gate-controlled switch, which is a controlled rectifier having the additional property that it can be turned off by negative gate-cathode current.

FIGURE 1 can be regarded as a development of FIGURE 4 in which the transistors 51, 16 are in effect combined. If the circuits are considered from this view-point, then FIGURES 2 and 3 really show two separate ideas, firstly the use of a single transistor 16 in place of the transistors 16, 18, and secondly the replacement of the resistor 17 or 52 by the saturable transformer. These two ideas can of course be applied either singly or in combination to the circuits shown in FIGURES 1 and 4.

In each of FIGURES 1 to 3, one or more of the circuit components can be so chosen that the circuit compensates automatically for variations in temperature.

In the modified form of FIGURE 4 shown in FIGURE 5, a diode 71 is included in series with the resistor 56, and the collector of the transistor 16 is connected through a resistor 72 to the base of a transistor 73 the emitter and collector of which are connected respectively to the line 12 and to the base of a transistor 74. The collector and base of the transistor are further connected through resistors 75, 76 respectively to the line 11, and the transistor 74 has its emitter connected to the line 12, and to the base of the transistor 73 through resistors 77, 78 respectively, and its collector connected to the line 11 through the primary winding 79 of a transformer 81 the secondary winding 82 of which is connected between the base and the emitter of the transistor 51.

In this example, when the transistor 16 is turned on the circuit including transistors 73, 74 switches to a state in which the transistor 74 conducts and provides a pulse of amplitude independent of battery voltage to the winding 79, so that a forward drive current independent of battery voltage is applied to the transistor 51. The diode 71 isolates the winding 54 from the base during turn-on, but the winding 54 provides a turn-off pulse. This pulse is not essential, although it does increase the switching speed, and where the pulse is not used the transformer 14 is omitted and the winding 13 is replaced by a resistor. Forward drive for the rectifier 26 is now provided by an extra winding on the transformer 81. It will be understood that when the transistor 18 turns on the transistor 74 is turned off again.

It will be appreciated that with such an arrangement the constant current drive of FIG. 5, provided by components 73, 74, 75, 76, 77, 78 and 81 may be removed from the circuit, and the drive from transformer 14 to transistor 51 may be suitably modified to provide the triggering required. The same modification to transformer 14 may be applied to FIG. 4.

It will be appreciated that the rectifier 26 constitutes a semi-conductor switch providing a discharge path for the capacitor 35. It is preferred to use a controlled rectifier as the switch because it is turned off reliably by the resonance of the discharge circuit of the rectifier 26. However, other forms of semi-conductor switch (e.g. a transistor or a gate controlled switch) could be utilised with suitable modifications to ensure that the switch turns on and off as required.

The transistor 16 in FIGURES 1 to 3 and the transistor 51 in FIGURES 4 and 5 also constitute a semi-conductor switch, providing a path through which energy is stored in the inductor 13 (FIGURES 1 to 3) or 48 (FIGURES 4 and 5). The switch 16 or 51 can also be replaced by other semi-conductor switches if the circuit is suitably modified, and as previously indicated, FIGURES 4 and 5 are suitable as shown for use with a gate-controlled switch in place of the transistor 51.

Having thus described our invention what we claim as new and desire to secure by Letters Patent is:

1. A spark ignition system for an internal combustion engine, comprising in combination a D.C. source, a series circuit connected across said D.C. source and including an inductor, a diode and a capacitor, a semi-conductor switch connected in a series circuit across said diode and said capacitor, a controlled rectifier connected in series with spark producing means across said capacitor, means for turning said semi-conductor switch on in timed relationship with the engine at instants when a spark is required, said means also acting to turn said controlled rectifier on at the same time as said semi-conductor switch, and said capacitor discharging through said controlled rectifier and said spark producing means to produce a spark when said controlled rectifier is turned on, said control rectifier being turned off when said capacitor has discharged, energy being stored in said inductor when semi-conductor switch is on, and means for turning said semi-conductor switch off when the current flowing in said inductor has a predetermined value, energy stored in said inductor being transferred, when said semi-conductor switch is turned off, by way of said diode to said capacitor.

2. A system as claimed in claim 1 in which the current flowing in the inductor is sensed by a resistor, and means is provided for turning said semi-conductor switch off when the current flowing in the resistor reaches a predetermined magnitude.

3. A system as claimed in claim 1 in which current starts to flow in the primary winding of a saturable transformer at the same time as it starts to flow through the inductor, and means is provided for turning said semi-conductor switch off when the transformer saturates.

4. A system as claimed in claim 1 including a bistable circuit which is driven from a first state to a second state by pulses derived from the engine, the semi-conductor switch and controlled rectifier being turned on when the bistable circuit is driven to its second state, and the bistable circuit being driven back to its first state to turn the semi-conductor switch off.

5. A system as claimed in claim 4 in which the bistable circuit when driven to its second state acts through a transformer to turn the controlled rectifier on.

6. A system as claimed in claim 5 in which the bistable circuit also acts through the transformer to turn the semi-conductor switch on.

7. A system as claimed in claim 5 in which the bistable circuit when driven to its second state operates a second circuit which operates through a further transformer to turn the semi-conductor switch on.

8. A system as claimed in claim 4 in which the semi-conductor switch is part of the bistable circuit.

9. A system as claimed in claim 8 in which the inductor constitutes the primary winding of a transformer, the secondary output of which turns the controlled rectifier on.

10. A system as claimed in claim 1 including a diode in the series circuit including the semi-conductor switch for protecting the semi-conductor switch from damage by reverse voltages induced in the inductor.

11. A system as claimed in claim 1 in which the semi-conductor switch is a transistor.

12. A system as claimed in claim 1 including components rendering the operation of the system substantially independent of variations in temperature.

References Cited
UNITED STATES PATENTS

| | | | |
|---|---|---|---|
| 2,899,632 | 8/1959 | Lawson | 323—58 |
| 3,263,124 | 7/1966 | Stuermer | 315—212 |
| 3,271,593 | 9/1966 | De Vilbiss | 307—88.5 |
| 3,302,629 | 2/1967 | Shano. | |
| 3,312,211 | 4/1967 | Boyer. | |

LAURENCE M. GOODRIDGE, *Primary Examiner.*